(12) United States Patent
Onoguchi

(10) Patent No.: US 10,933,295 B2
(45) Date of Patent: Mar. 2, 2021

(54) HANDLE FOR HANDLE-EQUIPPED SNOWBOARD AND HANDLE-EQUIPPED SNOWBOARD HAVING SAME

(71) Applicant: NEXAM INC., Tokyo (JP)

(72) Inventor: Kohichi Onoguchi, Tokyo (JP)

(73) Assignee: NEXAM INC., Tokyo (JP)

( * ) Notice: Subject to any disclaimer, the term of this patent is extended or adjusted under 35 U.S.C. 154(b) by 0 days.

(21) Appl. No.: 16/471,832

(22) PCT Filed: Dec. 21, 2016

(86) PCT No.: PCT/JP2016/088206
§ 371 (c)(1),
(2) Date: Jun. 20, 2019

(87) PCT Pub. No.: WO2018/116425
PCT Pub. Date: Jun. 28, 2018

(65) Prior Publication Data
US 2020/0094125 A1  Mar. 26, 2020

(51) Int. Cl.
A63C 5/06 (2006.01)
A63C 5/03 (2006.01)

(52) U.S. Cl.
CPC . *A63C 5/06* (2013.01); *A63C 5/03* (2013.01)

(58) Field of Classification Search
CPC ...... B62B 13/046; B62B 13/08; B62B 17/061
(Continued)

(56) References Cited

U.S. PATENT DOCUMENTS 3,529,847 A * 9/1970 Shores ............... B62B 13/043
                                                    280/14.22
4,606,548 A * 8/1986 Little ................ B62B 13/043
                                                    280/14.28
(Continued)

FOREIGN PATENT DOCUMENTS

JP    S5116820 B1    5/1976
JP    2004501692 A   1/2004
(Continued)

OTHER PUBLICATIONS

International Search Report (PCT/ISA/210) dated Feb. 21, 2017, by the Japanese Patent Office as the International Searching Authority for International Application No. PCT/JP2016/088206.

*Primary Examiner* — Jeffrey J Restifo
(74) *Attorney, Agent, or Firm* — Buchanan Ingersoll & Rooney PC

(57) ABSTRACT

A handle for a snowboard with handle that can be manufactured in a simple manufacturing process and has increased strength is provided. Further, a snowboard with handle provided with such a handle is provided. A handle for a snowboard with handle to be attached to a sliding board of a snowboard to form a snowboard with handle includes a front-side plate part, a back-side plate part, and a handle main body having a reinforcing member joining an inside surface of the front-side plate part and an inside surface of the back-side plate part and having a hollow portion inside, wherein the reinforcing member internally includes a core member constituted of a hollow cylindrical body or a columnar body having a predetermined thickness. Further, a snowboard with handle including this handle for a snowboard with handle.

11 Claims, 6 Drawing Sheets

(58) Field of Classification Search
USPC .................. 280/15, 16, 17, 14.27, 14.28
See application file for complete search history.

(56) References Cited

U.S. PATENT DOCUMENTS

| | | | | |
|---|---|---|---|---|
| 5,351,975 A * | 10/1994 | Petoud | .................. | B62B 17/065 |
| | | | | 280/14.28 |
| 5,516,126 A * | 5/1996 | Myers | ...................... | A63C 5/00 |
| | | | | 280/14.28 |
| 6,139,031 A * | 10/2000 | Wingard | .................. | A63C 5/03 |
| | | | | 280/14.28 |
| 6,736,414 B2 * | 5/2004 | Farrally-Plourde | ..... | B62B 13/04 |
| | | | | 280/14.25 |
| 6,923,455 B2 * | 8/2005 | Sullivan | .................. | A63C 5/02 |
| | | | | 280/14.27 |
| 6,997,465 B2 * | 2/2006 | Jungnickel | ............ | B62B 13/043 |
| | | | | 280/14.27 |
| 7,104,551 B2 * | 9/2006 | Takahashi | ............... | B62B 13/04 |
| | | | | 280/14.25 |
| 7,137,925 B2 * | 11/2006 | Rozycki | ............. | A63B 69/0093 |
| | | | | 482/51 |
| 7,204,496 B2 * | 4/2007 | Rawcliffe | ............. | A63C 10/02 |
| | | | | 280/14.21 |
| 7,240,908 B2 * | 7/2007 | Sankrithi | ............... | A63C 5/033 |
| | | | | 280/14.21 |
| 7,246,804 B2 * | 7/2007 | Onoguchi | ............... | A63C 5/03 |
| | | | | 280/14.21 |
| 7,374,180 B2 * | 5/2008 | Farmer | .................... | A63C 5/03 |
| | | | | 280/14.22 |
| 7,699,323 B2 * | 4/2010 | Taylor | ...................... | A63C 1/36 |
| | | | | 280/14.21 |
| 8,177,241 B1 * | 5/2012 | Marks | ................... | B62B 13/046 |
| | | | | 280/14.28 |
| 8,905,410 B1 * | 12/2014 | Winchester | .............. | A63C 5/03 |
| | | | | 280/14.27 |
| 8,944,440 B2 * | 2/2015 | Elkinton | ................ | B63B 32/00 |
| | | | | 280/14.28 |
| 2003/0160403 A1 | 8/2003 | Rawcliffe | | |
| 2004/0171463 A1 * | 9/2004 | Rozycki | ........... | A63B 69/0093 |
| | | | | 482/51 |
| 2005/0212229 A1 * | 9/2005 | Rawcliffe | ............. | B62B 13/043 |
| | | | | 280/14.27 |
| 2005/0280223 A1 * | 12/2005 | Su | .......................... | B62B 17/08 |
| | | | | 280/14.27 |

FOREIGN PATENT DOCUMENTS

| | | |
|---|---|---|
| JP | 2005125011 A | 5/2005 |
| JP | 2014097756 A | 5/2014 |

* cited by examiner

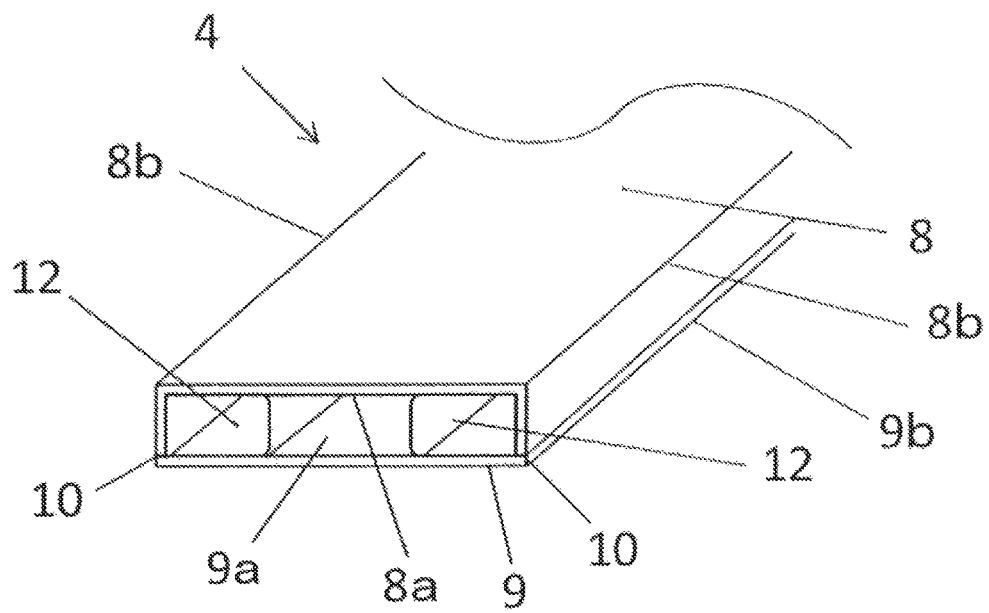
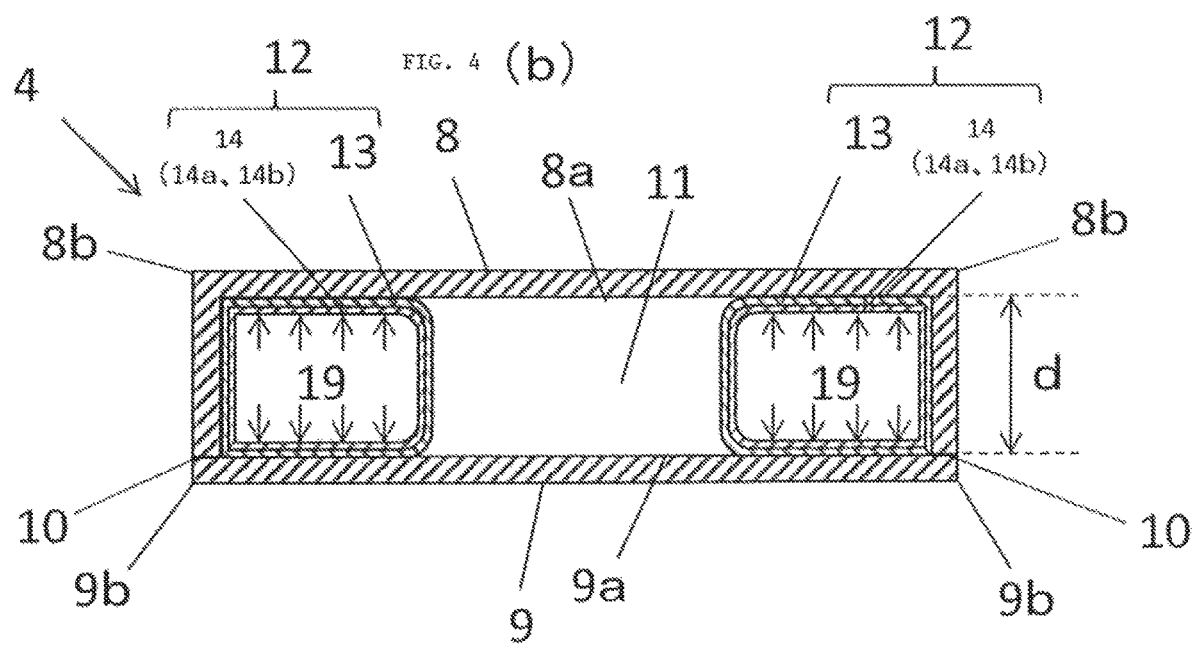

HANDLE FOR HANDLE-EQUIPPED SNOWBOARD AND HANDLE-EQUIPPED SNOWBOARD HAVING SAME

TECHNICAL FIELD

The present invention relates to a snowboard with handle.

BACKGROUND ART

A snowboard with handle is such that a handle is attached to a sliding board of a snowboard.

Conventionally, when the handle is manufactured, as illustrated in FIG. 6, a front-side plate part 8 and a back-side plate part 9 made of synthetic resin (for example, a fiber reinforced resin such as carbon fiber reinforced resin) are joined by bonding with a resin such as epoxy resin applied to a joining surface 10, thereby making a handle 16 including a handle main body 4 having a hollow portion 11 formed inside.

CITATION LIST

Patent Literature

Patent Literature 1: JP 2005-125011 A

SUMMARY OF INVENTION

Technical Problem

When a rider operates the snowboard with handle to perform slalom snowboarding such as slalom or meandering snowboarding on a snow surface, a load may be concentrated on the handle main body by large twisting of the handle. In addition, when a heavy rider operates the snowboard with handle, a load due to weight shift may concentrate on the handle main body. Furthermore, a load due to a fall may concentrate on the handle main body. In these cases, there is a risk of breaking the handle main body, such as bending and damaging the handle main body.

Accordingly, the structure is strengthened by joining the front-side plate part and the back-side plate part made of synthetic resin by bonding, making a small hole in the back-side plate part of the handle main body in which a hollow portion is formed inside, and injecting a resin such as foamed resin to fill the inside to make the handle main body filled with the foamed resin inside.

However, it is not easy to manufacture the handle main body filled with the foamed resin inside by once forming a hollow handle main body with a hollow inside portion, and thereafter injecting and filling a resin such as foamed resin through a small hole formed in the back-side plate part. In addition, when the inside of the handle main body is filled with a resin such as foamed resin, the weight increases and it becomes difficult to operate the handle.

An object of the present invention is to provide a handle for a snowboard with handle that can be manufactured by a simple manufacturing process and has improved strength.

Further, another object of the present invention is to provide a snowboard with handle provided with such a handle.

Solution to Problem

The invention of claim 1 is a handle for a snowboard with handle to be attached to a sliding board of a snowboard to form a snowboard with handle, the handle including: a front-side plate part, a back-side plate part, and a handle main body having a reinforcing member joining an inside surface of the front-side plate part and an inside surface of the back-side plate part and having a hollow portion inside, in which the reinforcing member internally includes a core member constituted of a hollow cylindrical body or a columnar body having a predetermined thickness.

Advantageous Effects of Invention

According to the present invention, it is possible to provide a handle for a snowboard with handle that can be manufactured by a simple manufacturing process and has improved strength.

It is also possible to provide a snowboard with handle provided with such a handle.

BRIEF DESCRIPTION OF DRAWINGS

FIG. 4 is an example of a handle main body related to a handle for a snowboard with handle according to the present invention, in which (a) is a partially omitted cross-sectional perspective view, and (b) is a cross-sectional view.

DESCRIPTION OF EMBODIMENTS

Hereinafter, an example of an embodiment of the present invention will be described with reference to the attached drawings.

Handle for Snowboard with Handle

Figure 5:
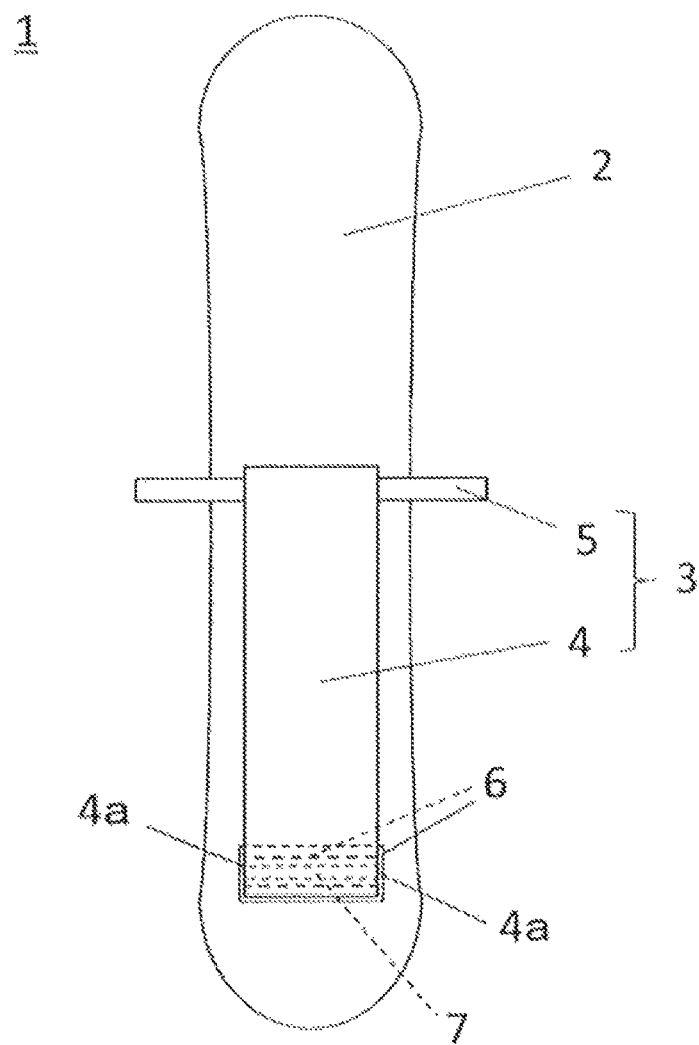
FIG. 5 is a view illustrating an example of a snowboard with handle according to the present invention, in which (a) is a plan view, and (b) is a side view.
Figure 5:
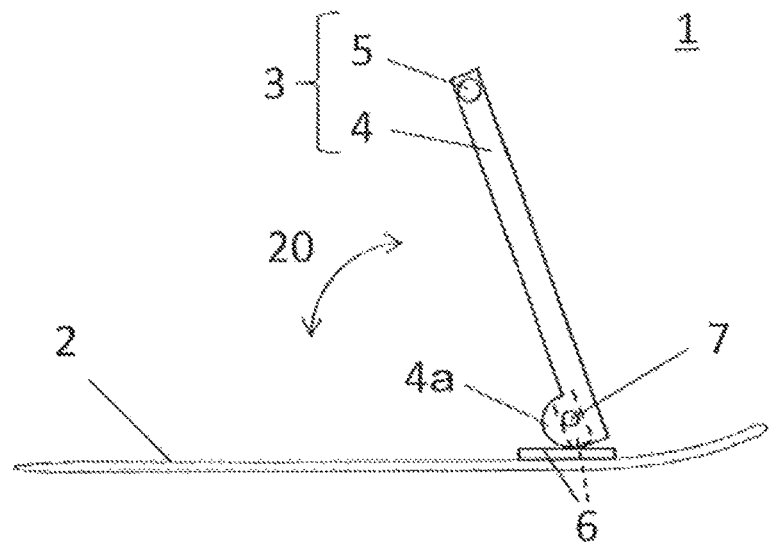
Figure 6:
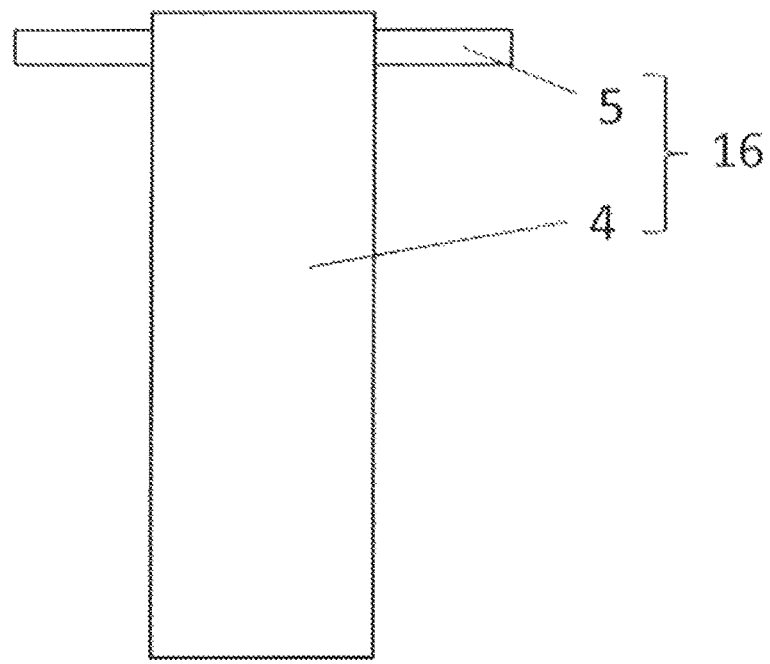
FIG. 6 is a view illustrating a conventional handle for a snowboard with handle, in which (a) is a front view, and (b) is a cross-sectional view of a handle main body.
Figure 6:
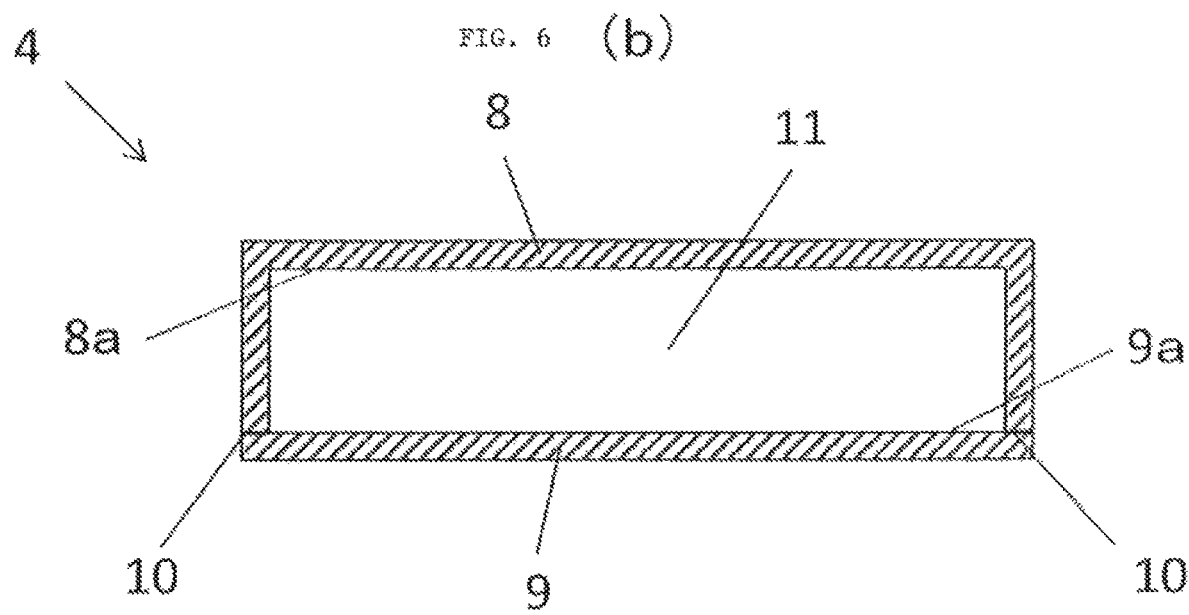

A handle 3 for a snowboard with handle according to the present invention (hereinafter also referred to as "handle 3") is provided with a handle main body 4 and a grip 5 as illustrated in FIG. 5. The grip 5 is fixed to an upper end of the handle main body 4 and extends in a left-right direction.

Figure 3:
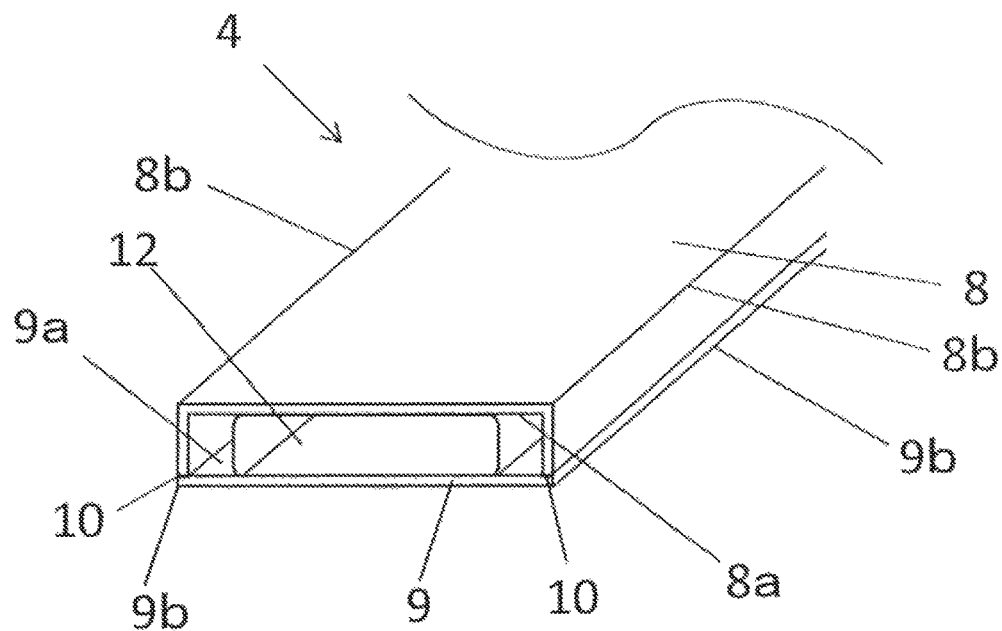
FIG. 3 is an example of a handle main body related to a handle for a snowboard with handle according to the present invention, in which (a) is a partially omitted cross-sectional perspective view, and (b) is a cross-sectional view.
Figure 3:
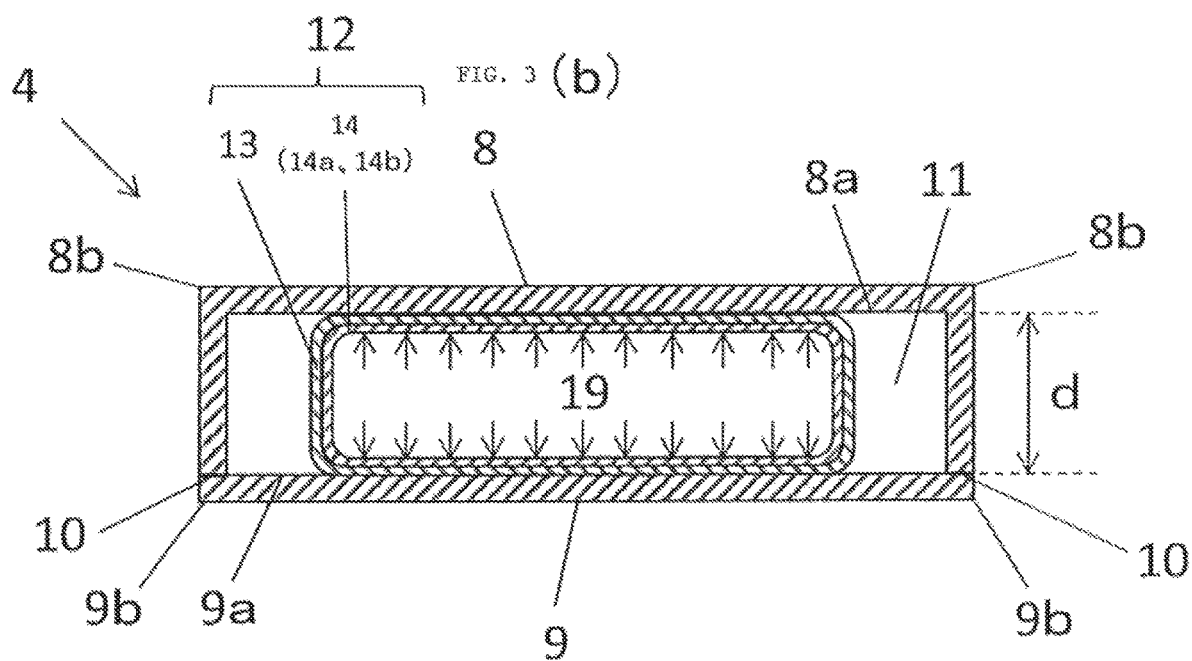

As illustrated in FIG. 3 and FIG. 4, the handle main body 4 includes a front-side plate part 8 and a back-side plate part 9 made of synthetic resin (for example, a fiber reinforced resin such as carbon fiber reinforced resin). An inside surface 8a of the front-side plate part 8 and an inside surface 9a of the back-side plate part 9 are joined with a cylindrical reinforcing member 12. At this time, a hollow portion 11 is formed inside the handle main body 4.

In the illustrated embodiment, by joining the inside surface 8a of the front-side plate part 8 and the inside surface 9a of the back-side plate part 9 with the cylindrical reinforcing member 12, long edges (8b and 9b) of the front-side plate part 8 and the back-side plate part 9 abut each other. Thus, the front-side plate part 8 and the back-side plate part 9 may be joined with each other also via the long edges (8b and 9b) of each other by bonding with a resin such as epoxy resin applied in advance to a joining surface 10 by the above-described conventional method.

Figure 1:
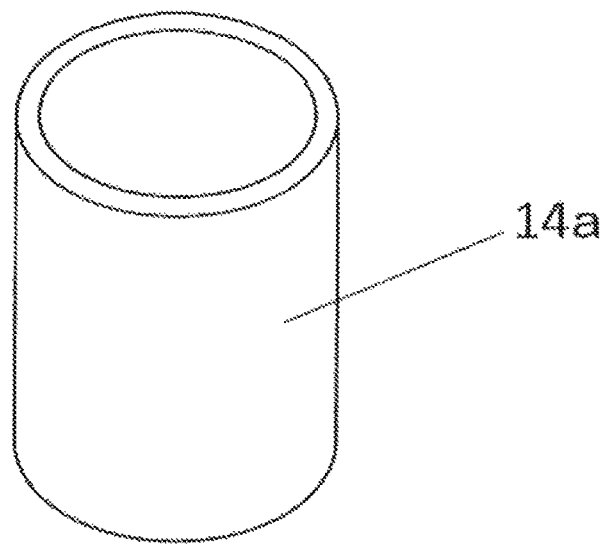
FIG. 1(a) is a view illustrating an example of a core member of a reinforcing member used in a handle for a snowboard with handle according to the present invention. (b) is a cross-sectional view of the reinforcing member in which a fiber material is adhered to an outer periphery of the core member illustrated in FIG. 1(a).
Figure 1:
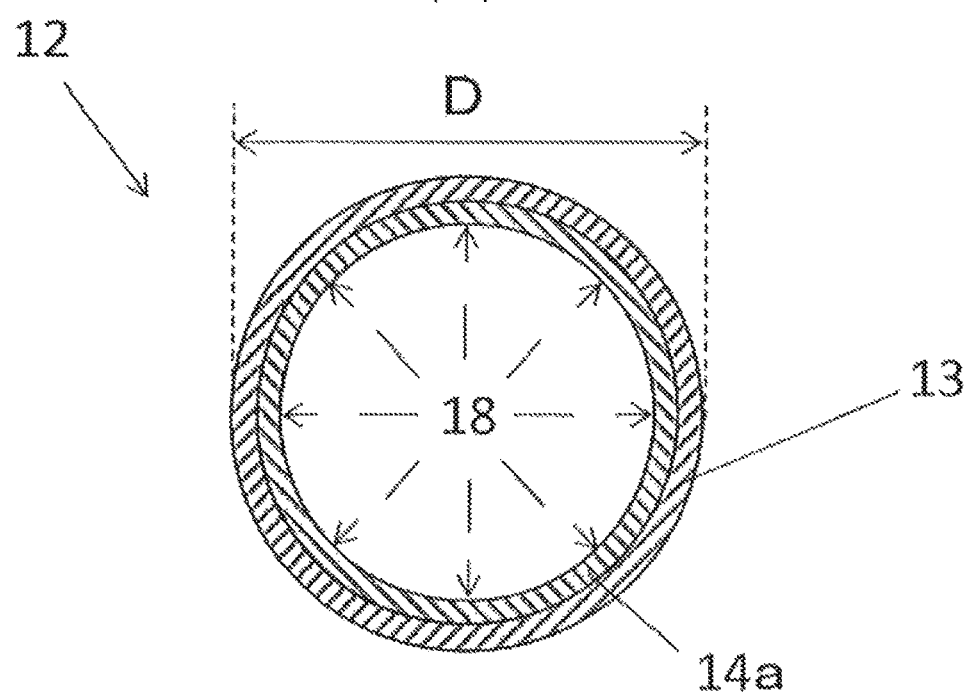

As illustrated in FIG. 1(b), the reinforcing member 12 includes a cylindrical core member 14a and an outer periphery reinforcing part 13 formed by stacking a fiber material such as a glass fiber, a carbon fiber, or a cellulose fiber on an outer periphery of the core member 14a.

The outer periphery reinforcing part 13 illustrated in FIG. 1(b) is such that the above-mentioned fiber material is impregnated with an adhesive and wound and adhered around the outer periphery of the core member 14a, and is formed with a thickness of 0.5 to 20 mm.

The core member 14a illustrated in FIG. 1(a) is a cylindrical body made of synthetic resin and having a thickness of 0.5 to 20 mm. In a state that the outer periphery reinforcing part 13 is formed on the outer periphery of the core member 14a, the diameter of the core member 14a slightly reduces radially inward, but the core member 14a is urged radially outward (in directions of arrows 18 in FIG. 1(b)) because a force operates to expand the diameter radially outward.

Note that since it is sufficient that the core member is urged radially outward in the state that the outer periphery reinforcing part 13 is formed on the outer periphery thereof, not only the cylindrical core member 14a but also a columnar body having a predetermined thickness can be used.

When manufacturing the handle main body 4, as illustrated in FIG. 3, a resin such as epoxy resin is applied to the outer periphery of the reinforcing member 12, and the reinforcing member 12 is disposed on the inside surface 8a of the front-side plate part 8 or the inside surface 9a of the back-side plate part 9. At this time, the reinforcing member 12 extends in parallel to the long edge 8b of the front-side plate part 8 and the long edge 9b of the back-side plate part 9 on a center portion of the inside surface 8a of the front-side plate part 8 and the inside surface 9a of the back-side plate part 9.

Thereafter, the inside surface 8a of the front-side plate part 8 and the inside surface 9a of the back-side plate part 9 are joined with the reinforcing member 12. Thus, the handle main body 4 is formed with a structure in which the reinforcing member 12 extends in parallel to the long edge 8b of the front-side plate part 8 and the long edge 9b of the back-side plate part 9 in the center portion of the inside surface 8a of the front-side plate part 8 and the inside surface 9a of the back-side plate part 9.

At this time, the front-side plate part 8 and the back-side plate part 9 may be joined with each other also via the long edges (8b and 9b) of each other by bonding with a resin such as epoxy resin applied in advance to the joining surface 10.

The size of the outer diameter of the reinforcing member 12 in the state illustrated in FIG. 1(b) is larger than the size of the hollow portion 11 formed in the handle main body 4. That is, the size of an outer diameter D of the reinforcing member 12 illustrated in FIG. 1(b) is larger than a distance d between the inside surface 8a of the front-side plate part 8 and the inside surface 9a of the back-side plate part 9 which constitute the handle main body 4 in the embodiment illustrated in FIG. 3.

The size of the outer diameter D of the reinforcing member 12 is larger than the distance d between the inside surface 8a of the front-side plate part 8 and the inside surface 9a of the back-side plate part 9 after being formed as illustrated in FIG. 3. Accordingly, when the front-side plate part 8 and the back-side plate part 9 are joined, the core member 14a is deformed, and the reinforcing member 12 is compressed to the distance d between the inside surface 8a of the front-side plate part 8 and the inside surface 9a of the back-side plate part 9.

Further, in a state that the front-side plate part 8 and the back-side plate part 9 are joined, the core member 14a is urged in directions to the inside surface 8a of the front-side plate part 8 and the inside surface 9a of the back-side plate part 9 (in directions of arrows 19 in FIG. 3(b)). Accordingly, an area of the reinforcing member 12 in contact with the inside surface 8a of the front-side plate part 8 and the inside surface 9a of the back-side plate part 9 is increased. Thus, adhesion between the inside surface 8a of the front-side plate part 8 and the inside surface 9a of the back-side plate part 9 with the reinforcing member 12 becomes favorable.

When the resin applied to the reinforcing member 12 is cured after the front-side plate part 8 and the back-side plate part 9 are joined, the cured reinforcing member 12 strengthens the internal structure of the handle main body 4.

In the embodiment illustrated in FIG. 4, when manufacturing the handle main body 4, a resin such as epoxy resin is applied to an outer periphery of each of the two reinforcing members 12, and the reinforcing members 12 are disposed on one long edge 8b side and the other long edge 8b side of the inside surface 8a of the front-side plate part 8, or one long edge 9b side and the other long edge 9b side of the inside surface 9a of the back-side plate part 9.

Thereafter, the inside surface 8a of the front-side plate part 8 and the inside surface 9a of the back-side plate part 9 are joined with the reinforcing members 12, 12. Thus, the handle main body 4 is formed with a structure in which the reinforcing members 12, 12 extend on the inside surface 8a of the front-side plate part 8 and the inside surface 9a of the back-side plate part 9 along the one long edges 8b, 9b and the other long edges 8b, 9b of the front-side plate part 8 and the back-side plate part 9, respectively.

At this time, the front-side plate part 8 and the back-side plate part 9 may be joined with each other also via the long edges (8b and 9b) of each other by bonding with a resin such as epoxy resin applied in advance to the joining surface 10.

Also in the embodiment illustrated in FIG. 4, the size of the outer diameter of the reinforcing member 12 in the state illustrated in FIG. 1(b) is larger than the size of the hollow portion 11 formed in the handle main body 4. That is, the size of the outer diameter D of the reinforcing member 12 illustrated in FIG. 1(b) is larger than the distance d between the inside surface 8a of the front-side plate part 8 and the inside surface 9a of the back-side plate part 9 which constitute the handle main body 4 in the embodiment illustrated in FIG. 4.

The size of the outer diameter D of the reinforcing member 12 is larger than the distance d between the inside surface 8a of the front-side plate part 8 and the inside surface 9a of the back-side plate part 9 after being formed as illustrated in FIG. 4. Accordingly, similarly to the embodiment illustrated in FIG. 3, when the front-side plate part 8 and the back-side plate part 9 are joined, the core member 14a is deformed, and the reinforcing member 12 is compressed to the distance d between the inside surface 8a of the front-side plate part 8 and the inside surface 9a of the back-side plate part. 9.

Further, in the state that the front-side plate part 8 and the back-side plate part 9 are joined, the core member 14a is urged in the directions to the inside surface 8a of the front-side plate part 8 and the inside surface 9a of the back-side plate part 9 (in the directions of arrows 19 in FIG. 4(b)). Accordingly, an area of the reinforcing member 12 in contact with the inside surface 8a of the front-side plate part 8 and the inside surface 9a of the back-side plate part 9 is increased similarly to the embodiment illustrated in FIG. 3. Thus, adhesion between the inside surface 8a of the front-side plate part 8 and the inside surface 9a of the back-side plate part 9 with the reinforcing member 12 becomes favorable.

When the resin applied to the reinforcing member 12 is cured after the front-side plate part 8 and the back-side plate part 9 are joined, the internal structure of the handle main body 4 is reinforced by the cured reinforcing member 12 similarly to the embodiment illustrated in FIG. 3.

Figure 2:
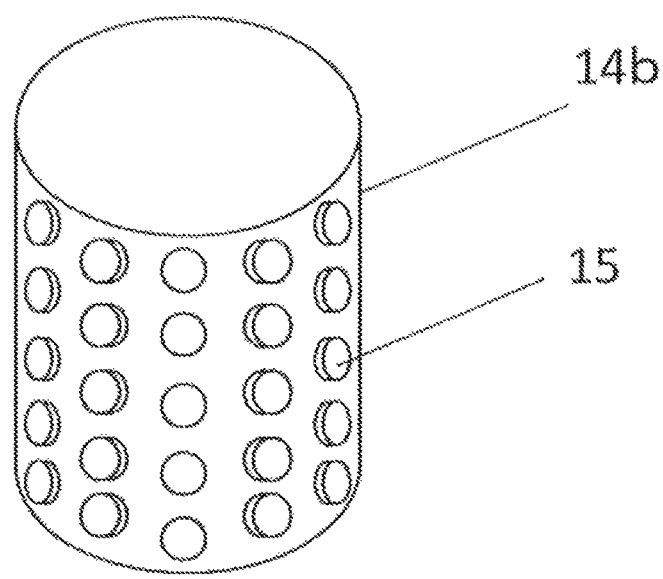
FIG. 2(a) is a view illustrating another example of a core member of a reinforcing member used in a handle for a snowboard with handle according to the present invention. (b) is a cross-sectional view of the reinforcing member in which a fiber material is adhered to an outer periphery of the core member illustrated in FIG. 2(a).
Figure 2:
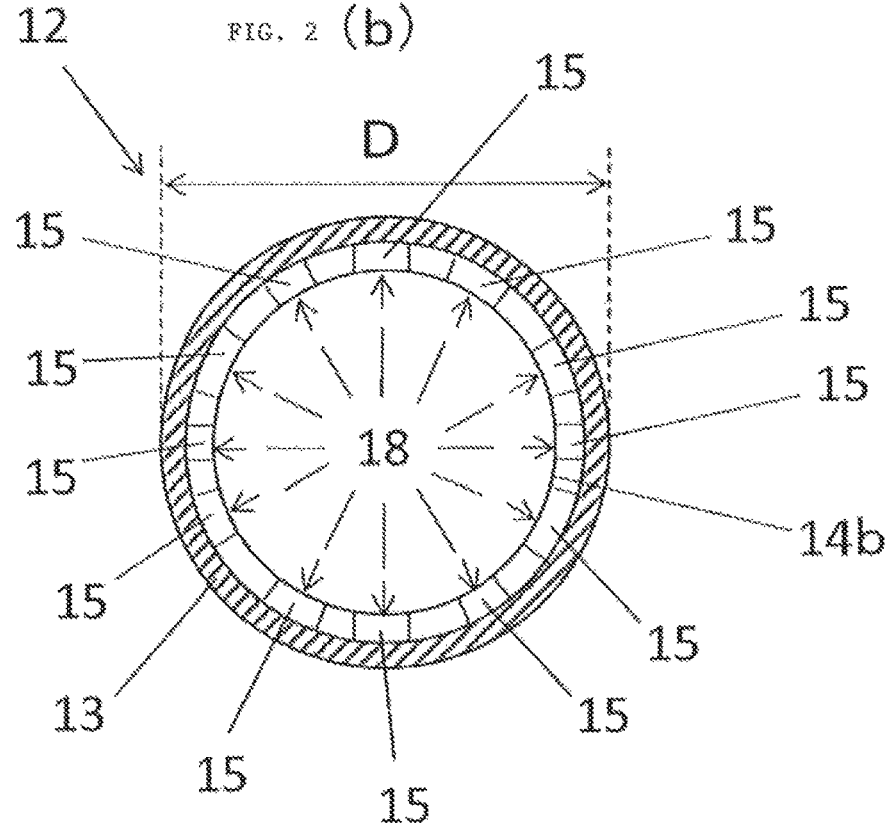

As the core member, besides the core member 14a illustrated in FIG. 1(a), a core member 14b constituted of a bubble cushioning material illustrated in FIG. 2(a) can also be used. The illustrated core member 14b includes a hollow cylindrical body constituted of a synthetic resin film, and a plurality of bubble portions 15 formed on an outer periphery thereof. In a state that the outer periphery reinforcing part 13 is formed on the outer periphery of the core member 14b, the diameter of the core member 14b slightly reduces radially inward, but the core member 14b is urged radially outward (in directions of arrows 18 in FIG. 2(b)) because a force operates to expand the diameter radially outward on the bubble portions 15.

When manufacturing the handle main body 4 using the reinforcing member 12 of FIG. 2(b) in which the core member 14b constituted of the bubble cushioning material is used, a resin such as epoxy resin is applied to the outer periphery of the reinforcing member 12, and the reinforcing member 12 is disposed on the inside surface 8a of the front-side plate part 8 or the inside surface 9a of the back-side plate part 9 as illustrated in FIGS. 3 and 4. Thereafter, the inside surface 8a of the front-side plate part 8 and the inside surface 9a of the back-side plate part 9 are joined with the reinforcing member 12.

Similarly to the reinforcing member 12 illustrated in FIG. 1(b), the size of the outer diameter D of the reinforcing member 12 including the core member 14b constituted of the bubble cushioning material is larger than the distance d between the inside surface 8a of the front-side plate part 8 and the inside surface 9a of the back-side plate part 9 after being formed in the above-described method as in FIG. 3 and FIG. 4. Accordingly, similarly to the embodiments illustrated in FIG. 3 and FIG. 4, when the front-side plate part 8 and the back-side plate part 9 are joined, the core member 14b is deformed, and the reinforcing member 12 is compressed to the distance d between the inside surface 8a of the front-side plate part 8 and the inside surface 9a of the back-side plate part 9.

Further, in the state that the front-side plate part 8 and the back-side plate part 9 are joined, the core member 14b is urged in directions toward the inside surface 8a of the front-side plate part 8 and the inside surface 9a of the back-side plate part 9 (directions of arrows 19 in FIG. 3(b) and FIG. 4(b)) by the plurality of bubble portions 15 provided on the outer periphery of the core member 14b. Accordingly, an area of the reinforcing member 12 in contact with the inside surface 8a of the front-side plate part 8 and the inside surface 9a of the back-side plate part 9 is increased similarly to the embodiments illustrated in FIGS. 3 and 4. Thus, adhesion between the inside surface 8a of the front-side plate part 8 and the inside surface 9a of the back-side plate part 9 with the reinforcing member 12 becomes more favorable.

Further, when the resin applied to the reinforcing member 12 is cured after the front-side plate part 8 and the back-side plate part 9 are joined, the cured reinforcing member 12 further strengthens the internal structure of the handle main body 4.

Thus, in the present embodiment, the size of the outer diameter D of the reinforcing member 12 is larger than the distance d between the inside surface 8a of the front-side plate part 8 and the inside surface 9a of the back-side plate part 9. Accordingly, when the front-side plate part 8 and the back-side plate part 9 are joined, the core members 14 (14a, 14b) are deformed, and the reinforcing member 12 is compressed to the distance d between the inside surface 8a of the front-side plate part 8 and the inside surface 9a of the back-side plate part 9.

Further, the core member 14 is urged in directions toward the inside surface 8a of the front-side plate part 8 and the inside surface 9a of the back-side plate part 9 in the state that the front-side plate part 8 and the back-side plate part 9 are joined. Accordingly, adhesion between the inside surface 8a of the front-side plate part 8 and the inside surface 9a of the back-side plate part 9 and the reinforcing member 12 becomes favorable, and the handle main body 4 in which the internal structure is strengthened can be formed.

In addition, because this method is merely applying a resin such as epoxy resin to the outer periphery of the core member 14a constituted of synthetic resin or the core member 14b constituted of a bubble cushioning material, and disposing the core member on the inside surface 8a of the front-side plate part 8 or the inside surface 9a of the back-side plate part 9, the structure of the handle main body 4 can be strengthened by a simpler manufacturing process than by the conventional process of boring a small hole in the back-side plate part of the handle having a hollow portion formed inside which is described above, and injecting and filling a resin such as foamed resin into an inside thereof, thereby filling the inside with the foamed resin.

Snowboard with Handle

The snowboard 1 with handle according to the present invention, as illustrated in FIG. 5, includes the sliding board 2 and the handle 3 for a snowboard with handle described above.

Side plates 4a, 4a are formed on both sides of a lower end portion of the handle 3.

A hinge 6 is provided on an upper surface of a front upper side of the sliding board 2.

A rotary shaft 7 provided on the upper surface of the front upper side of the sliding board 2 is inserted through through holes provided in the side plates 4a, 4a and through holes provided in the hinge 6. Thus, the handle 3 is rotatable about the rotary shaft 7 in a vertical direction indicated by arrows 20 illustrated in FIG. 5(b).

In the snowboard handle 3 with the handle described above, the size of the outer diameter D of the reinforcing member 12 is larger than the distance d between the inside surface 8a of the front-side plate part 8 and the inside surface 9a of the back-side plate part 9. Accordingly, when the front-side plate part 8 and the back-side plate part 9 are joined, the core member 14 is deformed, and the reinforcing member 12 is compressed to the distance d between the inside surface 8a of the front-side plate part 8 and the inside surface 9a of the back-side plate part 9.

Further, the core member 14 is urged in directions toward the inside surface 8a of the front-side plate part 8 and the inside surface 9a of the back-side plate part 9 in the state that the front-side plate part 8 and the back-side plate part 9 are joined. Accordingly, adhesion between the inside surface 8a of the front-side plate part 8 and the inside surface 9a of the back-side plate part 9 and the reinforcing member 12 becomes favorable, and the internal structure of the handle main body 4 is strengthened. Thus, the internal structure of the handle main body 4 constituting the handle 3 is also strengthened in the snowboard 1 with the handle in which the handle 3 for the snowboard with handle of the present embodiment is employed.

REFERENCE SIGNS LIST

1 Snowboard with handle
2 Sliding board
3 Handle
4 Handle main body
4a Side plate
5 Grip
6 Hinge
7 Rotary shaft
8 Front-side plate part
8a Inside surface
8b Long edge
9 Back-side plate part
9a Inside surface
9b Long edge
10 Joining surface
11 Hollow portion
12 Reinforcing member
13 Outer periphery reinforcing part
14 (14a, 14b) Core member
15 Bubble portion
16 Conventional handle

The invention claimed is:

1. A handle for a snowboard with handle to be attached to a sliding board of a snowboard to form a snowboard with handle, the handle comprising:
a front-side plate part; a back-side plate part; and a handle main body having a reinforcing member joining an inside surface of the front-side plate part and an inside surface of the back-side plate part and having a hollow portion inside, wherein
the reinforcing member comprises a core member constituted of a hollow body having a predetermined thickness and an outer periphery reinforcing part formed by stacking a fiber material on an outer periphery of the core member,
a size of an outer dimension of the outer periphery reinforcing part is larger than an internal dimension of the hollow portion such that when the front-side plate part and the back-side plate part are joined, the core member presses against the inside surface of the front-side plate part and against the inside surface of the back-side plate-part.

2. The handle for a snowboard according to claim 1, wherein the reinforcing member extends in parallel to a long edge of the front-side plate part and a long edge of the back-side plate part and extends on a center portion of the inside surface of the front-side plate part and the inside surface of the back-side plate part.

3. A snowboard with handle comprising the handle for a snowboard with handle according to claim 2.

4. The handle for a snowboard according to claim 1, wherein the reinforcing member extends along each of one long edge and another long edge of the front-side plate part and the back-side plate part, on the inside surface of the front-side plate part and the inside surface of the back-side plate part.

5. A snowboard with handle comprising the handle for a snowboard with handle according to claim 4.

6. The handle for a snowboard with handle according to claim 1, wherein the core member includes a plurality of bubble portions on an outer peripheral surface thereof, and is urged in directions to the inside surface of the front-side plate part and the inside surface of the back-side plate part.

7. A snowboard with handle comprising the handle for a snowboard with handle according to claim 6.

8. A snowboard with handle comprising the handle for a snowboard with handle according to claim 1.

9. The handle for a snowboard according to claim 1, wherein the core member is constituted of a hollow cylindrical body having a predetermined thickness.

10. The handle for a snowboard according to claim 1, wherein the core member is constituted of a columnar body having a predetermined thickness.

11. The handle for a snowboard according to claim 1, wherein the core member is constituted of a columnar body having a predetermined thickness.

* * * * *